May 12, 1959
J. C. CARTER
2,885,817
FLOAT FOR FISHING ROD AND REEL
Filed Nov. 8, 1957
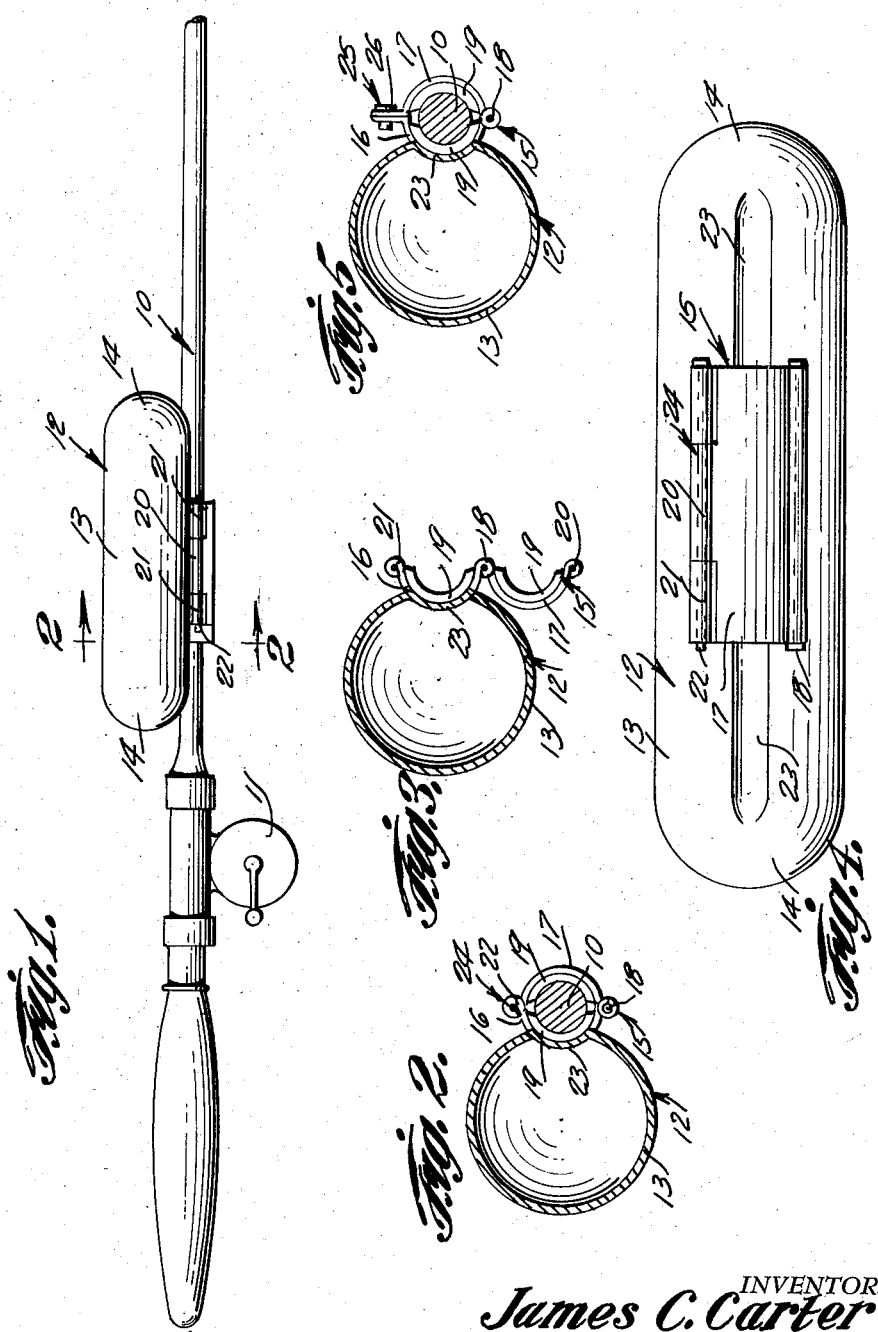
INVENTOR.
James C. Carter
BY *Victor J. Evans & Co.*
ATTORNEYS

United States Patent Office 2,885,817
Patented May 12, 1959

2,885,817

FLOAT FOR FISHING ROD AND REEL

James C. Carter, Detroit, Mich.

Application November 8, 1957, Serial No. 695,421

3 Claims. (Cl. 43—25)

This invention relates to a buoyant attachment for fishing rods and reels.

The object of the invention is to provide a float device which is adapted to be releasably connected to a fishing rod and reel, whereby in the event that the rod and reel fall into the water, the float will retain the fishing rod and reel in a buoyant condition so that the rod and reel will not sink to the bottom of the water whereby the rod and reel can be readily retrieved by the user or owner thereof.

This invention is an improvement over the float device shown and described in my prior Patent No. 2,220,395.

Another object of the invention is to provide a float device for preventing sinking of objects which may accidentally drop into the water, and wherein the float device of the present invention is adapted to be made of plastic, and wherein there is provided a novel means for releasably clamping the float device to a fishing rod or other article being used.

A further object of the invention is to provide a float device for attachment to fishing rods or the like, wherein the float device is extremely simple and inexpensive to manufacture.

Other objects and advantages will be apparent during the course of the following description.

In the accompanying drawings, forming a part of this application, and in which like numerals are used to designate like parts throughout the same.

Figure 1 is an elevational view showing the float device of the present invention connected to a fishing rod.

Figure 2 is a sectional view taken on the line 2—2 of Figure 1.

Figure 3 is a view similar to Figure 2 but showing the device removed from the fishing rod and showing the clamp in open position.

Figure 4 is a view taken at right angles to the view shown in Figure 1, and showing the device removed from the fishing rod.

Figure 5 is a view similar to Figure 2, but illustrating a modification.

Referring in detail to the drawings, the numeral 10 indicates a fishing rod of conventional construction which includes the usual reel 11, and the present invention is directed to a float device which is indicated generally by the numeral 12. The float device 12 includes a hollow member or float 13 which has rounded end portions 14, Figures 1 and 4.

There is further provided a means for releasably attaching or clamping the float 13 to the fishing rod 10, and this clamping means is indicated generally by the numeral 15. The clamping means 15 includes an upper section 16 and a lower section 17, and these sections 16 and 17 are hingedly connected together by means of a hinge or pivot pin 18. Yieldable pads or strips 19 are adapted to be secured to the inner surfaces of the sections 16 and 17 for gripping the outer portion of the rod 10 as shown in Figure 2, and these yieldable strips help provide a snug clamping arrangement on the fishing rod.

As shown in the drawings, a means is provided for locking the sections 16 and 17 together, and this means comprises in one form of the invention a removable pin 22 which extends through eye portions 21 and 20 on the sections 16 and 17. Thus, by removing the pin 22, the section 17 can pivot about the pin 18 whereby the device can be readily removed from the fishing rod 10 when the float device is not needed or when it is not being used. One surface of the float 13 is provided with an elongated semi-cylindrical or arcuate groove 23 which receives or conforms to the configuration of the fishing rod 10. The locking mechanism for the sections 16 and 17 is indicated by the numeral 24 in Figures 2 and 4, for example.

In Figure 5 there is shown a modified locking mechanism which is indicated generally by the numeral 25, and the locking mechanism 25 includes or utilizes snap fasteners 26 instead of the removable pin 22.

From the foregoing, it is apparent that there has been provided a float device which is an improvement over the float device shown and described in my prior Patent No. 2,220,395. In use, the float device 12 of the present invention is adapted to be attached to a fishing rod such as the fishing rod 10. However, it is to be understood that the float device can be used with other articles besides fishing rods. With the present invention attached to an article such as a fishing rod, it will be seen that in the event the fishing rod accidentally falls or drops into the water, the buoyant float 13 will cause the fishing rod to remain on the surface of the water so that it can be readily retrieved and wherein the fishing rod will be prevented from sinking to the bottom of the water. Thus, valuable fishing rods and reels will not be lost even though they may be accidentally dropped overboard by a fisherman.

The float 13 and its associated parts are adapted to be made of plastic, and there will be no interference with normal use of the fishing rod when the device is attached as shown in the drawings. The float 13 is provided with an elongated arcuate groove 23 which conforms to the configuration of the adjacent portion of the fishing rod 10. The clamp 15 includes the coacting sections 16 and 17 which may be retained in place by either of several different methods. For example, the removable pin 22 can be used for retaining the sections 17 and 16 connected together, so that by removing the pin 22, the parts can swing open to the position shown in Figure 3 from the position shown in Figure 2 whereby the device can be readily removed from the fishing rod. In Figure 5, snap fasteners 26 are illustrated which are adapted to be used in lieu of the removable pin 22. The yieldable pads 19 which may be made of sponge rubber or the like serve to insure that there will be a tight and snug clamping fit of the device on the fishing rod.

By utilizing plastic for making the device, a highly improved structure is provided, and the float 13 may be made of transparent rigid plastic which is thin so that the float 13 will be buoyant and watertight. The portions of the clamp may also be molded from a suitable plastic, and the hinge pins may be made of a suitable metal such as stainless steel or brass. The yieldable pads 19 permit the device to be mounted on fishing rods of different diameters.

The above description of the invention is for illustrative purposes only and it is understood that modifications may be made in the construction within the scope and spirit of the following claims.

I claim:

1. In a buoyant device for attachment to an article, a hollow float having a substantially cylindrical shape and rounded end portions, there being an elongated groove in said float for engagement with the article, and means for releasably clamping the float to the article, said means comprising upper and lower semi-circular clamping sections, said lower clamping section being mounted on said groove, a pin hingedly connecting said upper and lower sections together, locking means for retaining said upper and lower sections connected together, and yieldable strips mounted contiguous to the inner surfaces of said upper and lower sections.

2. In a buoyant device for attachment to an article, a hollow float having a substantially cylindrical shape and rounded end portions, there being an elongated groove in said float for engagement with the article, and means for releasably clamping the float to the article, said means comprising upper and lower semi-circular clamping sections, said lower clamping section being mounted in said groove, a pin hingedly connecting said upper and lower sections together, locking means for retaining said upper and lower sections connected together, and yieldable strips mounted contiguous to the inner surfaces of said upper and lower sections, said locking means comprising a removable pin, there being eye portions on said upper and lower sections for receiving said removable pin.

3. In a buoyant device for attachment to an article, a hollow float having a substantially cylindrical shape and rounded end portions, there being an elongated groove in said float for engagement with the article, and means for releasably clamping the float to the article, said means comprising upper and lower semi-circular clamping sections, said lower clamping section being mounted in said groove, a pin hingedly connecting said upper and lower sections together, locking means for retaining said upper and lower sections connected together, and yieldable strips mounted contiguous to the inner surfaces of said upper and lower sections, said locking means comprising snap fasteners for releasably connecting said upper and lower sections together.

References Cited in the file of this patent
UNITED STATES PATENTS

| | | |
|---|---|---|
| 39,335 | Beckman | July 28, 1863 |
| 572,226 | Spiegel | Dec. 1, 1896 |
| 1,883,041 | Somers | Oct. 18, 1932 |
| 1,999,702 | Lafond et al. | Apr. 30, 1935 |
| 2,220,395 | Carter | Nov. 5, 1940 |
| 2,285,888 | Benton | June 9, 1942 |
| 2,693,605 | Berlew | Nov. 9, 1954 |